United States Patent [19]

Brasseur et al.

[11] Patent Number: 5,640,075
[45] Date of Patent: Jun. 17, 1997

[54] METHOD FOR CONTROLLING A STEPPING MOTOR

[75] Inventors: Georg Brasseur; Andreas Noichl; Manfred Trefalt; Roman Turba, all of Wien, Germany

[73] Assignee: Siemens Sktiengesellschaft, Munich, Germany

[21] Appl. No.: 406,932
[22] PCT Filed: Sep. 29, 1993
[86] PCT No.: PCT/EP93/02646
   § 371 Date: Mar. 29, 1995
   § 102(e) Date: Mar. 29, 1995
[87] PCT Pub. No.: WO94/08279
   PCT Pub. Date: Apr. 14, 1994

[30] Foreign Application Priority Data

Sep. 29, 1992 [DE] Germany ............. 921 16 657.5

[51] Int. Cl.⁶ .................................... G05B 19/40
[52] U.S. Cl. ............................... 318/685; 318/696
[58] Field of Search .......................... 318/685, 696, 318/254

[56] References Cited

U.S. PATENT DOCUMENTS

| | | |
|---|---|---|
| 4,241,301 | 12/1980 | Pohlig . |
| 4,280,084 | 7/1981 | Chiang . |
| 4,518,907 | 5/1985 | Giguere . |
| 4,734,847 | 3/1988 | Hunter . |
| 4,761,598 | 8/1988 | Lourenich ................. 318/685 |
| 4,772,839 | 9/1988 | MacMinn et al. ........... 38/685 X |
| 4,855,660 | 8/1989 | Wright et al. . |
| 4,884,016 | 11/1989 | Aiello ...................... 318/685 |
| 4,929,879 | 5/1990 | Wright et al. ............. 318/685 X |
| 5,198,741 | 3/1993 | Shinada et al. ........... 318/685 X |

FOREIGN PATENT DOCUMENTS 0360099  3/1990  European Pat. Off. .

*Primary Examiner*—David S. Martin
*Attorney, Agent, or Firm*—Hill, Steadman & Simpson

[57] ABSTRACT

A method for controlling a stepping motor includes the steps of storing step angles as an angle table in memory so that the magnitudes of the step angles rise as microsteps from an initial position having an initial value of zero to a final position having a final value in the order of magnitude of a coarse step; connecting field windings of the stepping motor to a switching device which sets a magnitude and direction of phase currents in the field windings as a function of a vector angle of a required vector which is switched onwards by one of the step angles per interval of a system clock, reading out from the memory the stored values in an increasing direction on one hand for acceleration and in a reverse direction on the other hand for braking, the step angle being dependent on the stored values which are read out from memory.

17 Claims, 3 Drawing Sheets

METHOD FOR CONTROLLING A STEPPING MOTOR

BACKGROUND OF THE INVENTION

1. Field of the Invention

The invention relates to a method for controlling a stepping motor whose field windings are connected to a switching device which sets the magnitude and direction of the phase currents in the field windings as a function of the vector angle of a required vector which is switched onwards by one step angle per interval of a system clock, which step angle is dependent on stored values which are read out in the direction of increasing values for acceleration and in the reverse direction for braking.

2. Description of the Related Art

Such a method is known from U.S. Pat. No. 4,280,084. There, the current step angle is formed as the sum of a constant coarse step and a fine step whose value rises or falls from step to step and is read from a memory. In this way, the lag angle (angular difference between the field vector and the rotor position) and thus the torque are held at their initial maximum value despite the changing rotor speed.

The invention is based on the knowledge that, during acceleration/deceleration with the maximum moment at the start and end of a displacement, the shortest possible displacement time is never achieved and that the suddenly acting high moment excites the stepping motor to oscillate, which frequently leads to step losses. Finally, this also results in an unfavorable dimensioning of the stepping motor since its maximum moment is utilized only briefly.

SUMMERY OF THE INVENTION

In contrast, the invention has the an object of shortening the time for a rotor displacement process and of reducing the tendency of the stepping motor to oscillate, with the stepping motor being more favorably dimensioned.

The invention provides that the step angles themselves are stored as an angle table and their magnitudes increase from an initial position having an initial value of zero via microsteps to a final position having a final value in the order of magnitude of a coarse step (for example a quarter step to a full step). As a consequence, smooth and continuous acceleration is possible with a low torque which maintains a very wide safety margin from the stalling torque, so that the risk of stepping losses is virtually precluded.

The possibility for an automatic and smooth transition between microstepping operation for the purpose of high resolution positioning and full stepping operation at a high displacement speed is particularly advantageous; according to the invention, no changeover between coarse stepping operation and microstepping operation is required for this purpose.

The step angles in the angle table preferably extend over at least one control cycle of 360° of the vector angle, which is governed by the phase currents. In the case of a two-phase stepping motor having 50 pole pairs, this corresponds to four full steps with a rotor angle of 1.8° each; one revolution of the electrical vector angle thus corresponds to a rotor angle of 7.2°. Larger adjusting movements are in this case carried our using the full stepping operation, the number of vector revolutions being stored in an overflow counter.

However, it is particularly favorable to dimension the step angles in the angle table for a given stepping motor that includes an actuating device such that the acceleration phase and the braking phase which directly follows the acceleration phase extend from the point of maximum speed as far as both limits of the maximum adjustment region: a positive or negative acceleration with a preferably constant torque thus takes place throughout the entire displacement. As a consequence, the shortest possible displacement time can be achieved, with a very low tendency to oscillate and with favorable dimensioning of the stepping motor.

If the stepping motor has to operate against a spring prestressing force in one direction, this means that the spring assists the braking process in this direction, and assists acceleration in the opposite direction. For this purpose, an optimum design requires different moments for acceleration and braking against the spring, in which case these moments should also be even smaller than the moments for acceleration and braking with the spring. This situation can also be taken into account by corresponding dimensioning of the step angles in other words by providing (asymmetric angle tables for the two rotation directions); the higher permissible moments during braking and acceleration with spring assistance can in this case be achieved, according to a development of the invention, by jumping over step angles also referred to as (multiple decrementation).

In the case of the known method described in the U.S. Patent cited above, the duration of the acceleration and braking phases and of a constant speed phase between the phases—called synchronous operation in the following text—is read from a memory as a function of a preset destination. In contrast, a development of the invention operates with an automatic changeover from the acceleration operation to synchronous operation or braking operation which is not dependent on the time but on the respective destination error.

For this purpose, one step angle and associated region parameters are read out per each interval, and at least two regions are thus defined, namely an incrementation region and a decrementation region. The next higher (acceleration operation) or the next lower (braking operation) step angle is then output depending on whether the destination error is located in one region or the other.

There is also expediently a correction region between the incrementation region and the decrementation region, which correction region is governed by a correction width region parameter for each step angle: if the destination error is within this correction width, the same step angle is output once again, that is to say the movement continues at an unchanged stepping speed (which is referred to as synchronous operation).

The associated, previously calculated value of the stepping speed at the end of the interval must also be assigned to each step angle in the step angle table, in addition to the region parameter. However, a development of the invention manages without this additional speed value if the system clock and interval length are kept constant: specifically, the stepping speed at the end of each interval is then directly proportional to the step angle. Particularly simple criteria for the transition from acceleration to synchronous running and to braking then result in this case.

BRIEF DESCRIPTION OF THE DRAWINGS

Further details and advantages of the invention are explained in more detail with reference to an exemplary embodiment of this type.

DETAILED DESCRIPTION OF THE PREFERRED EMBODIMENTS.

Figure 1:
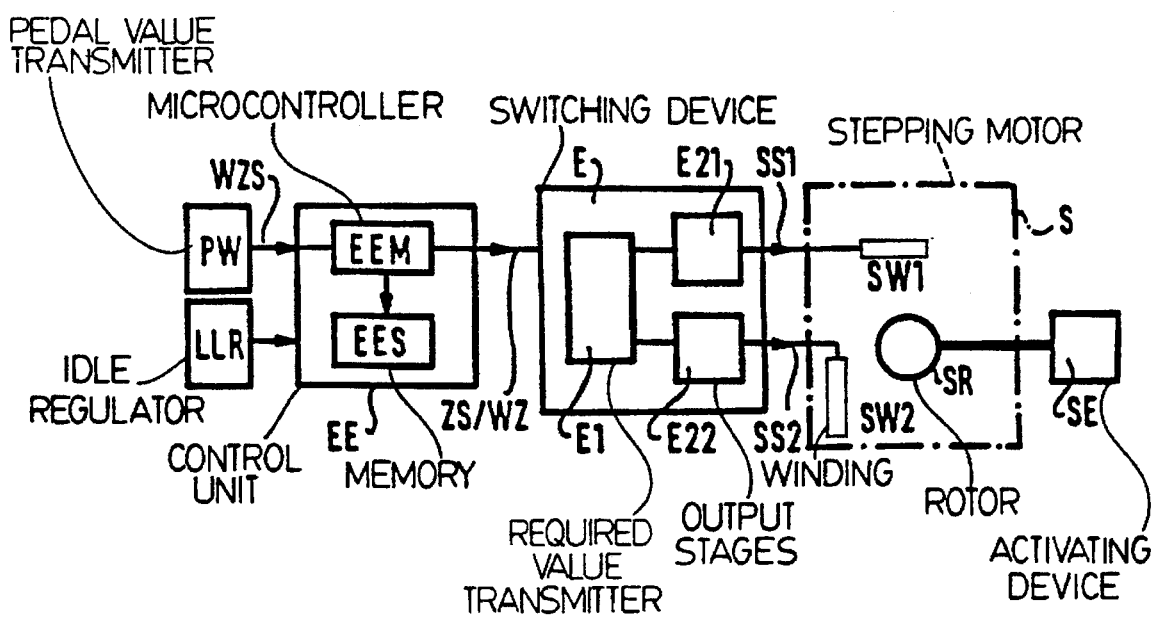
FIG. 1 shows the block diagram of an arrangement for carrying out the invention.

According to FIG. 1, the rotor SR of a two-phase, 50-pole stepping motor S is coupled to an actuating device SE; this is preferably a throttle valve which is fitted directly on the extended shaft of the rotor. The two field windings SW1, SW2 are offset spatially through 90 degrees with respect to one another and produce an electrical current vector, depending on the magnitude and direction of the phase currents SS1, SS2 flowing through it, which is intended to be determined by the vector angle WZ of a required vector ZS. To this end, the required vector ZS is fed to a switching device E, which essentially comprises a required value transmitter E1 and two output stages E21, E22 which are controlled by the required value transmitter E1, the switching device E setting the phase current SS1, SS2 to the respective required value. To this end, the required value transmitter E1—essentially an analog/digital converter with 8 bits—produces two required values which are proportional to the sine and cosine of the vector angle WZ of the required vector ZS.

The required vector ZS is supplied from a control unit EE having a microcontroller or microprocessor EEM and a memory EES, to be precise with a resolution of 360/512= 0.703° electrical or 7.2/512=0.01406° mechanical (=one microstep).

The required value WZS of the vector angle WZ of the required vector ZS is supplied by a pedal value transmitter PW or by an idle regulator LLR.

The angle table is stored in a memory EES which can be addressed and read from by the microprocessor EEM, to be precise such that the step angles are assigned to successive addresses, which are governed by address pointers, such that their magnitudes rise starting with the initial value at an initial address to the final value at a final address, as is illustrated by way of example in the table in the appendix for a number of selected addresses TA.

In addition to the stored columns (address TA, step angle WS, region parameters switching separation BA and correction width BAK), in order to assist understanding, this table additionally contains the time, the stepping speed ZG, the vector engle WZ as the sum of the step angle WS from the initial position 31, and the associated rotor angle WR. Since this table is based on an interval duration of 1 ms, the numerical value of the step angle WS and the stepping speed ZG is identical. The variables WS, ZG, BA and BAK are indicated in multiples of a microstep MS.

In the case of this exemplary embodiment, two angle tables which each apply to one rotation direction form a single overall table with continuous addresses TA. In this case, the same step angles are used for acceleration and braking and are just read out successively in a different direction.

However, it is within the context of the invention to store a plurality of tables per rotation direction having different step widths for braking operation and/or acceleration operation, and to change from one table to the other as a function of additional parameters.

Figure 2:
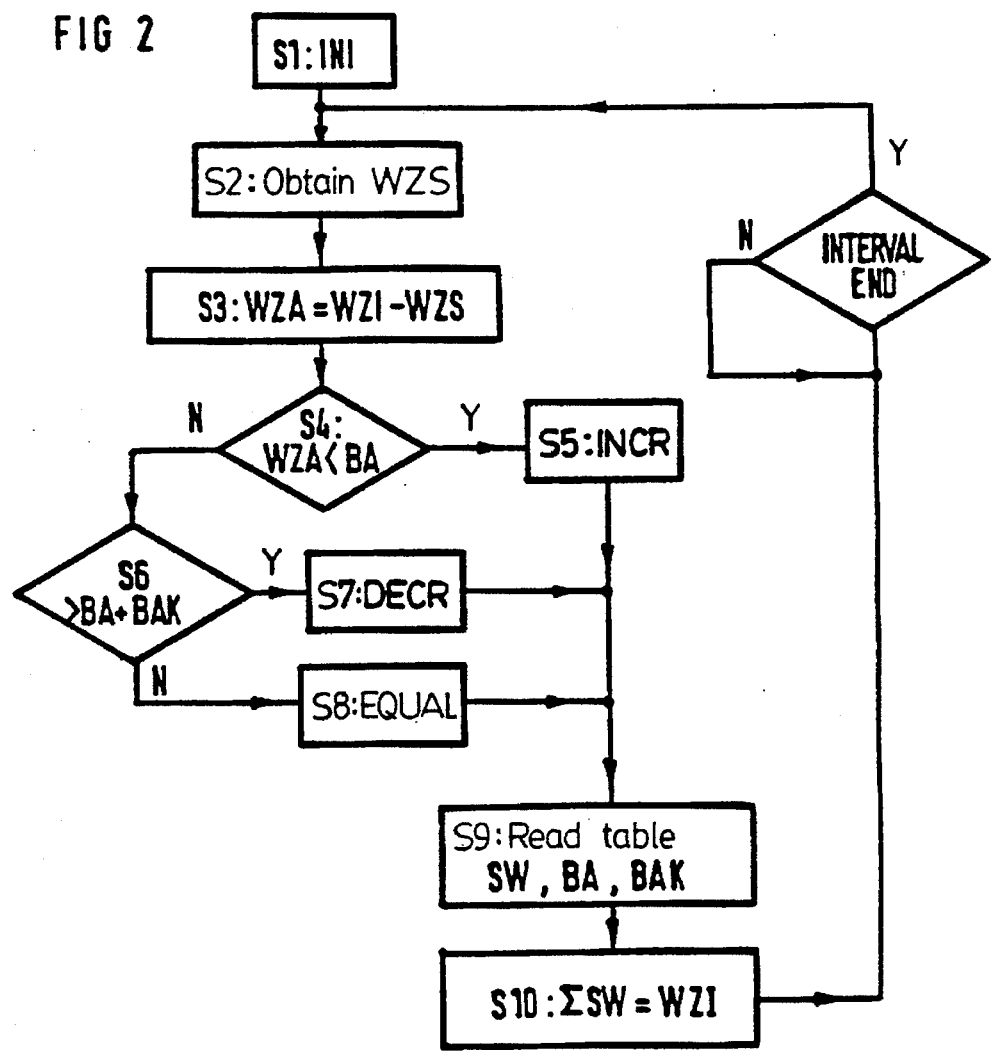
FIG. 2 shows a program sequence.

The program illustrated in FIG. 2 essentially runs in the microcontroller EEM using the stored values:

During starting up, an initialization is carried out in step S1; during the initialization the stepping motor is moved into a final position with (closed throttle valve), the address pointer of the angle table in the memory EES is set to the the initial position (initial address 31), and a position memory for the actual value WZI is set to zero. The following program steps are then repeated in each interval of a system clock, signal for example after every millisecond.

In step S2, the required value WZS is obtained from the pedal value transmitter PW or from the idle regulator LLR and is stored in a buffer. In step S3, the destination error WZA is then calculated as the difference between the required value WZS and the actual value WZI formed in the preceding interval and is stored in the position memory. In step S4, a check is then carried out to determine whether the destination error WZA is in the incrementation region, which is the case when the destination error is less than the switching separation BA of a switching curve KS. If this is the case, the address of the angle table is incremented and, if it is not the case, a check is carried out in step S6 to determine whether the destination error is in the decrementation region, that is to say whether it is greater than the sum of the switching separation BA and the correction width BAK of the correction region. If this is the case, the address of the angle table is decremented in step S7, and if this is not the case, it remains the same, so that the same step angle is output once again in the next interval.

The values, determined by the address pointer, of the step angle WS, of the switching separation BA and of the correction width BAK are read in step S9. The actual value WZI is formed in step S10 by the step angle as read out being added, with the correct mathematical sign, to the contents of the position memory, so that the latter contains the sum of all the step angles WS from initialization and thus the current vector angle, which is a measure of the position of the rotor. If the address pointer is in a final position or in a limiting position produced by limiting, the associated step angle is output in successive intervals until the destination error satisfies the criterion for the transition to braking operation. This step angle is added into the position memory a corresponding number of times.

These steps are repeated after the end of each interval as long as the destination error is not equal to zero.

Figure 3:
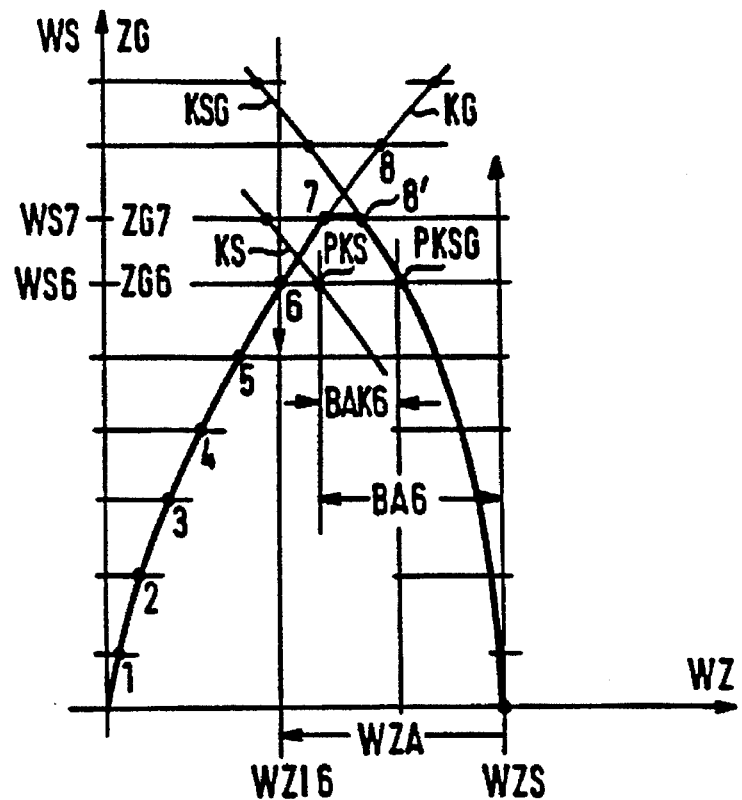
FIG. 3 shows a phase plane (stepping speed plotted against step angle) in order to explain the changeover criteria.

The phase plane according to FIG. 3 shows the behavior of the angular velocity ZG (which means the same as the step angle WS), as a function of the vector angle WZ. The points on a basic curve KG are given by the individual rows in the angle table and show an acceleration behavior. The end of each interval (step) is marked by sequential numbers 1 to 8. The stepping speed ZG6, which is proportional to the step angle WS6, results at the end of the 6th step with said step angle WS6, as well as the vector angle WZI6, which is stored in the position memory as the sum of all the step angles WS (WS1 to WS6) from the initial position. A target deviation WZA which is negative—in accordance with the definition—results together with the required position value WZS.

Since, the target deviation WZA is smaller (more negative) than the associated switching separation BA6, the address is incremented and the step angle WS7 is output. The destination error which is associated with this point and is determined in the next (7th) interval is now within the correction width BAK so that the step angle remains unchanged for the following (8th) interval.

Instead of the indicated criterion, the current step angle WS on the ordinate of the phase plane could also be compared at every point with the angle which is given by the curves KS and KSG. However, these angles would first have to be calculated by interpolation if—as is normal—the curves KS and KSG are stored only in the form of points. In principle, the result would be the same, however: specifically, at the point 6, the angle given by KS is greater than step angle WS6 and, accordingly, acceleration must be carried out. The step angle WS7 associated with point 7 is, in contrast, between the step angles given by the curves KS and KSG and, in consequence, no change in the step angle WS need be carried out.

Figure 4:
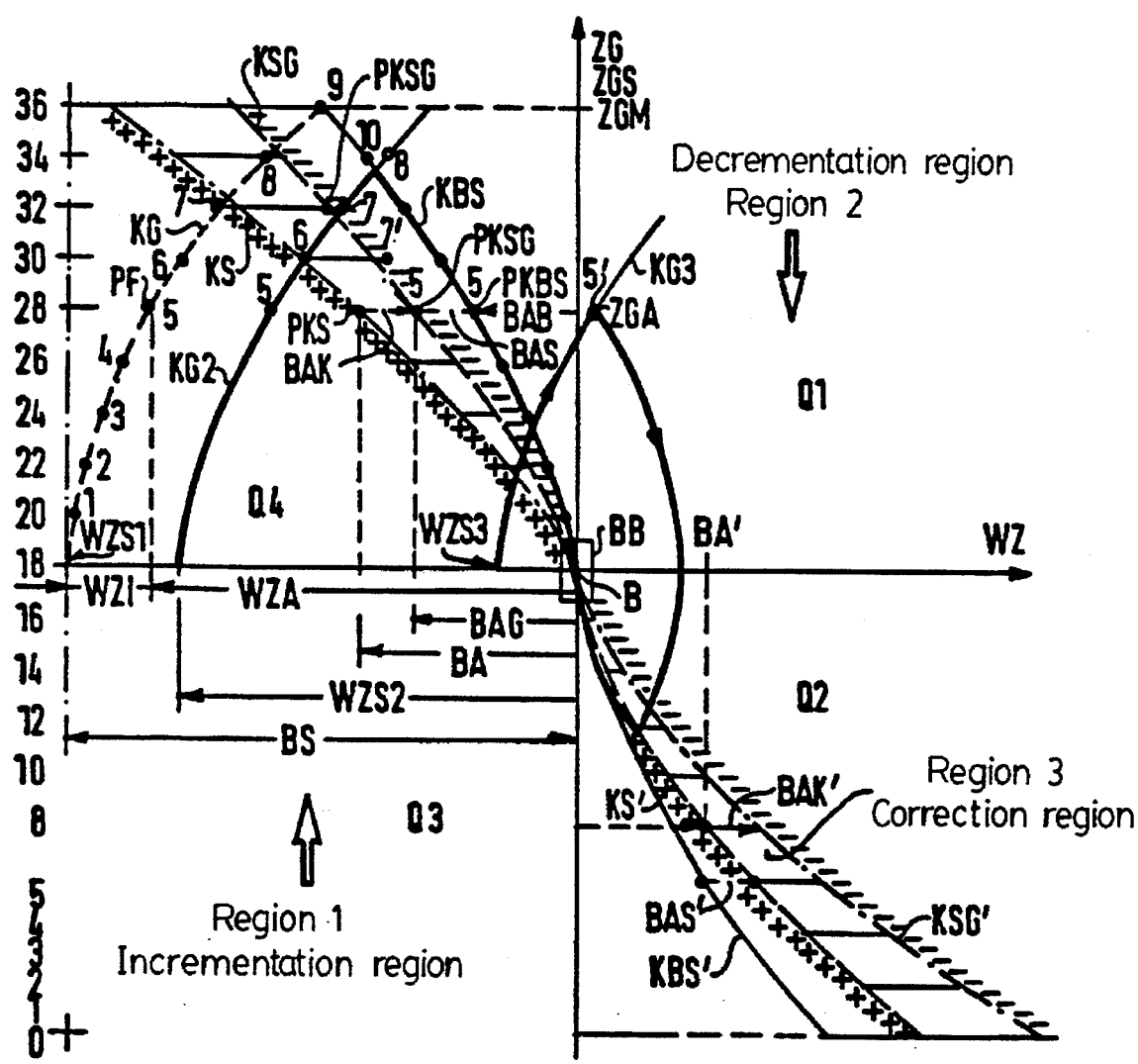
FIG. 4 shows a phase plane having four quadrants in order to illustrate acceleration and braking operation in two different directions.

The variables and their relationships with one another will be dealt with in detail with reference to FIG. 4: the figure shows a coordinate system having four quadrants Q1 to Q4 (corresponding to the angle table on page 6) in which the vector angle WZ and angular variables associated with it, especially the destination error WZA, are shown on the abscissa, and the angular velocity ZG (=stepping speed ZGS) is shown on the ordinate. The maximum adjustment region BS of, for example, 90° of a throttle valve extends from the destination position B at the origin of the coordinate system towards negative values: in accordance with the definition of the destination error WZA as the difference between the actual value WZI and the required value WZS, a negative required value WZS1 of 90° corresponds to the throttle valve being completely opened from the closed position. A basic curve KG extends from this point and is determined by fixing points PF which are in each case given by a position in the angle table. The sum of all the step angles as read out since initialization is in each case indicated on the abscissa, as the actual value WZI.

The basic curve reaches the maximum speed ZGM approximately in the center of the adjustment region BS, from where a required braking curve KBS extends to the destination position B which this curve enters at the angular velocity zero; it is determined by braking points PKBS which each have a braking separation BAB from the destination position B, the braking separation BAB being equal to that of the fixing points PF from the required value WZS: this is thus a mirror image of the basic curve.

In the example, the required braking curve KBS and the basic curve KG have the same speed ZGM at the same destination error at the end of the ninth interval (point 9). Thus, in this case, an interruption-free transition is possible into the ideal required braking curve KBS. However, this is usually not the case, as the second basic curve KG2 assigned to a second required value WZS2 shows: in this case, the angular velocity at the end of the seventh interval is still below the required braking curve KBS, but it is already above it at the end of the next interval—point 8: a braking curve which is first connected to the end of the eighth interval would thus not reach the destination point directly, but only after a further acceleration and braking in the opposite direction have been carried out.

In order to avoid this delaying "overshooting" of the destination point, the transition from acceleration into braking operation is oriented on two further curves, specifically a switching curve KS and a limit curve KSG, both of which are derived from the required braking curve KBS and its braking points PKBS. The switching curve KS is determined by the switching points PKS and the limit curve KSG by the limit points PKSG, these points, which are assigned to one another end to the fixing point PF of the basic curve KG, having the same speed in the same interval (being assigned to the same step angle). Each switching point PKS has a switching separation BA from the destination position B, and each limit point PKSG has a destination separation BAG from the destination position B.

Figure 5:
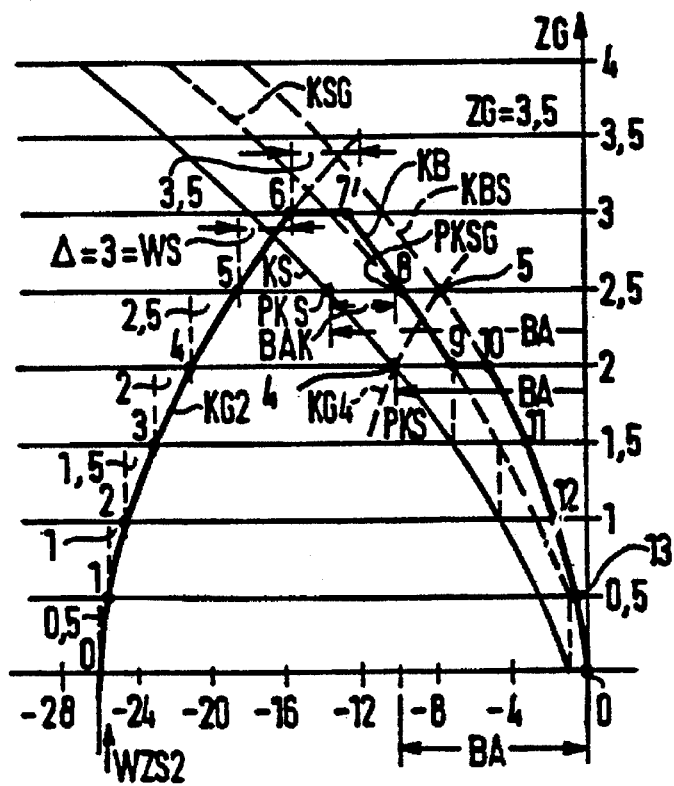
FIG. 5 shows a positioning process according to FIG. 4 in detail.

A intercept interval BAS, which is at least equal to the step angle at the respective stepping speed ZGS, is located between each braking point PKBS on the required braking curve KBS and the limit of a correction region 3 facing it. This limit is formed by the limit curve KSG in the case of quadrant Q4, and by the switching curve KS' in the case of the quadrant Q2. This difference has no physical meaning but just makes calculation easier taking into account the different mathematical signs for each movement direction and quadrant. The indicated dimensioning of the intercept interval BAS ensures that an interval which starts on the limit curve KSG in the quadrant Q4 or on the switching curve KS' in the quadrant Q2—point 9 in FIG. 5—does not end beyond the required braking curve, but precisely on it—point 10 in FIG. 5.

The correction width BAK of the correction region 3 at every stepping speed is at least equal to the difference between the sums of the catchment separation BAS and the braking separation BAB at the next higher stepping speed and at the current stepping speed $(BAB+BAS)_{n+1}-(BAB+BAS)_n$. This dimensioning ensures that an interval which starts on the switching curve KS or on the limit curve KSG'—point 4 in FIG. 5—ends precisely on the required braking curve KBS (point 5).

The stored switching separation BA which is assigned to the individual step angles results from these variables as the sum of the braking separation BAB, the intercept interval BAS and the correction width BAK.

At the end of the fifth interval in FIG. 4, the target deviation of the basic curve KG2—taking into account the mathematical sign—is clearly smaller than the switching separation BA at the intercept speed ZGA: the address pointer is thus incremented and the next higher step angle is output. The destination error at the end of this 6th interval is then, however, already above the switching curve KS, that is to say within the correction width BAK, with the result that the address pointer remains unchanged for the following (7th) interval, so that the destination error at the end of the seventh interval (at point 7) is already in the decrementation region 2, which is bounded by the limit curve KSG. A changeover is accordingly made to braking operation, a behavior resulting which can be seen more clearly from FIG. 5. From this it can be seen that the current braking curve KB initially runs between the limit curve KSG and the required braking curve KBS in order then—point 9—to enter the correction region slightly again: as a consequence, the speed regions unchanged during the 10th interval and the current braking curve KB meets the required braking curve at point 10 and then runs with the required braking curve to the destination position in an ideal manner.

FIG. 4 also shows the case in which a new required position WZS3 is predetermined within the duration of the 5th interval, which position leads to a positive target deviation and makes a direction reversal necessary. This situation can be shown by shifting curve KG2 into the position of curve KG3. The point 5' on curve KG3 now lies far above the required braking curve in the decrementation region 2, for which reason an immediate changeover into braking operation is made, which initially leads to a further increase in the target deviation. Further decrementation is thus carried out after reaching the stationary position, that is to say acceleration in the opposite direction is carried out, and incrementation (braking) is subsequently carried out as soon as the destination error has become less than the switching separation BA given by interval KS'.

In the case of the invention, these processes take place automatically and result by simple decrementation of the addresses in the angle table. The assignment of the addresses to the step angles is therefore indicated at the left-hand edge by the characters 0 to 36 in FIG. 4, 18 being the address for the initial value 0 which is the (rest position). In this case, the curves which are illustrated in the quadrants Q2 and Q4 form two angle tables which apply to different rotation directions and are combined to form an overall table with continuous addresses. In this case, the address pointer is incremented as long as the destination error is less than the value which is given by the switching curve KS for the one rotation direction corresponding to (opening of the throttle valve) and by the limit curve KSG' for the opposite rotation direction (incrementation region 1).

On the other hand, the address pointer is decremented as long as the target deviation is greater than the value which is given by the limit curve KSG for one rotation direction—opening of the throttle valve—and by the switching curve KS' for the other rotation direction in (decrementation region 2). The correction region 3 is located between the two regions whose boundaries are marked by plus and minus signs: if the destination error is in this region, the address pointer remains unchanged in this position.

As a deviation from the illustration in FIG. 4, the curves can be selected asymmetrically, particularly if the stepping motor has to operate against a spring during opening, for which purpose curves which run flat (basic curve in quadrant Q4 and braking curves in the quadrant Q2) are expedient. The reduction in the displacement speed linked with this can be compensated for by decrementing twice or even three times during braking and acceleration with spring assistance—that is to say in the decrementation region 2 in FIG. 4: in consequence, the sum of two or even three successive step angles becomes effective within a single interval as step angle.

If the destination error and the associated angular velocity comes to lie within a narrow destination region BB about the destination position B, the control via the angle table is interrupted and the vector angle WZ of the required vector is set directly to the required value WZS.

In the context of the invention, it is possible in a simple manner to make the maximum angular velocity adjustable, especially as a function of parameters of an internal combustion engine. For this purpose, it is necessary only for the region within which the address pointer can move to be limited in a corresponding manner. It is also possible to provide a plurality of step angle tables, having acceleration and braking curves of different gradient, per rotation direction, which tables can in each case be activated as a function of operating parameters of an internal combustion engine.

Although other modifications and changes may be suggested by those skilled in the art, it is the intention of the inventors to embody within the patent warranted hereon all changes and modifications as reasonably and properly come within the scope of their contribution to the art.

APPENDIX

| TA No | Time ms | WS MS | ZG MS/ms | WZ MS | WR Degrees | BA MS | BAK MS |
|---|---|---|---|---|---|---|---|
| 60 | 29 | 127 | 127 | 2062 | 28.99 | −1065 | 127 |
| 47 | 16 | 76 | 76 | 711 | 9.99 | −373 | 80 |
| 46 | 15 | 72 | 72 | 635 | 8.93 | −338 | 76 |
| 33 | 2 | 14 | 14 | 24 | 0.34 | −14 | 18 |
| 32 | 1 | 10 | 10 | 10 | 0.14 | −10 | 14 |
| 31 | 0 | 0 | 0 | 0 | 0 | 0 | 10 |

APPENDIX-continued

| TA No | Time ms | WS MS | ZG MS/ms | WZ MS | WR Degrees | BA MS | BAK MS |
|---|---|---|---|---|---|---|---|
| 30 | 1 | −12 | 12 | −12 | −0.17 | 60 | 48 |
| 29 | 2 | −20 | 20 | −32 | −0.45 | 96 | 64 |
| 28 | 3 | −28 | 28 | −60 | −0.84 | 139 | 79 |
| 19 | 12 | −72 | 72 | −559 | −7.86 | 715 | 156 |
| 18 | 13 | −76 | 76 | −635 | −8.9 | 799 | 164 |
| 6 | 28 | −124 | 124 | −1859 | −26.14 | 2114 | 255 |
| 5 | 29 | −128 | 128 | −1987 | −27.93 | 2242 | 255 |

We claim:

1. A method for controlling the armature of a stepping motor with field windings in main steps and/or micro steps to a target position defined by the target value of a control signal, comprising:

a control unit including a memory for an angle table with a multitude of addresses, wherein:

under each of said addresses are stored one step angle and at least two region parameters defining an incrementation region and a decrementation region;

values of said step angles stored under succeeding incremented addresses increase by a microstep or multiples of a microstep from an initial address having an initial value of zero to a final address having a final value equating a main step;

a switching device connected to said field windings which controls magnitude and direction of phase currents in said field windings so that a vector of a resulting magnetic field follows a vector angle of said control signal controlling said switching device;

the method comprising in each interval of a system clock the steps of:

reading out said step angle and associated region parameters from said memory under an actual address;

changing said vector angle of said control signal in accordance with said step angle read out from said memory;

forming an actual value as a sum of all step angles read out from said memory starting from an initial position;

forming a target deviation as a difference between said actual value and a target value;

comparing said target deviation with said region parameters to determine in which of said at least two regions said target deviation is located; and defining an address for a next interval corresponding to a result of said comparison.

2. A method as claimed in claim 1, further comprising the step of:

setting directly the vector angle of the vector to the value—without being controlled via the angle table—as soon as said target deviation and said step angle in an interval are less than associated limit values.

3. A method as claimed in claim 1, wherein a correction region between said incrementation region and said decrementation region is defined by a further region parameter stored under each address, and further comprising the step of:

reading out the actual step angle once again if said target deviation is in said correction region.

4. A method as claimed in claim 3, wherein said system clock and interval are constant.

5. A method as claimed in claim 4, wherein a switching distance and a correction width are assigned to each said addresses as region parameters, the method further comprising the steps of:

reading out these values under the actual address pointer per interval, determining whether said target deviation is less than the switching distance or greater than the sum of the switching distance and the correction region or is between said switching distance on one hand and said sum on the other hand, and changing said actual address by incrementing or decrementing it or leaving it unchanged, respectively.

6. A method as claimed in claim 5, further comprising the step of:

providing at least one angle table for each rotation direction, and mathematical signs of said step angles differ for different rotation directions.

7. A method as claimed in claim 6, further comprising the step of:

reading from a same one of said angle tables in a step by step manner in both directions for acceleration and braking.

8. a method as claimed in claim 7, further comprising the step of:

forming an overall table from two angle tables which apply to different rotation directions in which the addresses rise from the initial address to the final value for one direction and reduce in the direction of the final value for another direction.

9. A method as claimed in claim 8, wherein a spring is provided assisting said stepping motor in one rotation direction, further comprising the step of:

jumping over at least the next address when said target deviation is in a region in which a braking or acceleration operation is assisted by said spring.

10. A method as claimed in claim 5, further comprising the steps of:

calculating a target braking curve which starts with a speed zero at a target position, said target braking curve being determined by braking points with a braking distance from the target position, and deriving a switching curve from the target braking curve, said switching curve being determined by switching points, each of which is at a switching distance from the target position at a switching speed.

11. A method as claimed in claim 10, wherein a intercept interval is present between each braking point on the target braking curve and that limit curve of the correction region which faces it, said intercept interval being at least equal to the step angle at the respective stepping speed.

12. A method as claimed in claim 11, wherein a correction width of the correction region at each stepping speed is equal to a difference between sums of said intercept interval and the braking distance at a next higher stepping speed and at a current stepping speed.

13. A method as claimed in claim 12, wherein the switching distance at each stepping speed is equal to a sum of the braking distance, said intercept interval and the correction width.

14. A method as claimed in claim 1, wherein said stepping motor is coupled to a metering device of an internal combustion engine, and the target position is governed by a pedal value transmitter.

15. A method as claimed in claim 14, further comprising the step of:

storing a plurality of acceleration tables and braking tables for acceleration curves and braking curves of different gradient, and activating one of said acceleration and braking tables as a function of operating parameters of the internal combustion engine.

16. A method as claimed in claim 14, wherein a maximum step angle is a function of parameters of the internal combustion engine.

17. A method as claimed in claim 14, wherein said metering device is a throttle valve actuating device, and the throttle valve is seated directly on an extended shaft of a rotor of said stepping motor.

\* \* \* \* \*